United States Patent
Le Coent

(10) Patent No.: US 6,476,282 B1
(45) Date of Patent: Nov. 5, 2002

(54) SUPERALKALINIZED ISOMERIZED LINEAR ALKYLARYL SULFONATES OF ALKALINE EARTH METALS, USEFUL AS DETERGENT/DISPERSANT ADDITIVES FOR LUBRICATING OILS, AND PROCESSES FOR THEIR PREPARATION AND INTERMEDIATE ALKYLARYL HYDROCARBON

(75) Inventor: Jean-Louis Marie Le Coent, Le Havre (FR)

(73) Assignee: Chevron Chemical S.A. (FR)

( * ) Notice: Subject to any disclaimer, the term of this patent is extended or adjusted under 35 U.S.C. 154(b) by 0 days.

(21) Appl. No.: 09/292,279

(22) Filed: Apr. 15, 1999

Related U.S. Application Data

(62) Division of application No. 08/611,860, filed on Mar. 6, 1996, now Pat. No. 5,939,594.

(30) Foreign Application Priority Data

Mar. 8, 1995 (FR) .............................. 95.02709

(51) Int. Cl.$^7$ ............................................... C07C 15/107
(52) U.S. Cl. ......................................................... 585/24
(58) Field of Search ........................................... 585/24

(56) References Cited

U.S. PATENT DOCUMENTS 4,764,295 A  8/1988  Le Coent ................... 252/33.2

FOREIGN PATENT DOCUMENTS

| EP | 0 001 318 | 12/1981 | ......... C07C/143/34 |
| FR | 2 564 830 | 11/1985 | ......... C07C/143/24 |

*Primary Examiner*—Robert Gerstl
(74) *Attorney, Agent, or Firm*—Josetta I. Jones

(57) ABSTRACT

A superalkalinized alkylaryl sulfonate of alkaline earth metal is disclosed. The aryl radical is either a tolyl, xylyl, o xylyl, ethyl phenyl, or cumenyl radical. The alkyl chain is a linear chain that contains between 14 and 40 carbon atoms, and the aryl sulfonate radical of alkaline earth metal is fixed, in a molar proportion comprised between 0 and 13% in positions 1 or 2 of the linear alkyl chain.

14 Claims, 4 Drawing Sheets

SUPERALKALINIZED ISOMERIZED LINEAR ALKYLARYL SULFONATES OF ALKALINE EARTH METALS, USEFUL AS DETERGENT/DISPERSANT ADDITIVES FOR LUBRICATING OILS, AND PROCESSES FOR THEIR PREPARATION AND INTERMEDIATE ALKYLARYL HYDROCARBON

This application is a Division of Ser. No. 08/611,860 filed Mar. 6, 1996, U.S. Pat. No. 5,939,594.

The present invention relates to superalkalinized alkylaryl sulfonates of alkaline earth metals obtained from linear alkylaryl sulfonic acids, and useful as detergent/dispersant additives for lubricating oils, processes for their preparation and an intermediate alkylation product.

BACKGROUND OF THE INVENTION

It is already known in the prior art to prepare slightly or highly superalkalinized sulfonates from sulfonic acids obtained by the sulfonation of different alkylaryl hydrocarbons and of an excess of alkaline earth base.

The alkylaryl hydrocarbons subjected to the sulfonation reaction result from alkylation by the Friedel-Crafts reaction of different aryl hydrocarbons, particularly aromatic, by two different types of olefin:

branched olefins resulting from the oligo-polymerization of propylene to $C_{15}$ to $C_{40}$ hydrocarbons, particularly the tetra polymer of propylene dimerized into a $C_{24}$ olefin, and linear olefins that result from the oligo-polymerization of ethylene to $C_{14}$ to $C_{40}$ hydrocarbons.

Thus European Patent No. 1.318 to the company Exxon, published in 1981, describes superalkalinized mono alkyl orthoxylene sulfonates and mono alkyl toluene sulfonates resulting from the alkylation of the corresponding aromatic hydrocarbons by a mixture of branched olefins comprising a maximum proportion of 30% of linear olefin.

Furthermore, French Patent No. 2.564.830 to the company Orogil, the former name of the Assignee, and whose corresponding application was published in 1985, and which corresponds to U.S. Pat. No. 4,764,295 describes alkylaryl sulfonates of alkaline earth metals resulting from alkylation by a linear olefin.

In both cases, the alkylation reaction takes place in the presence of a Friedel-Crafts catalyst with a high excess of moles of the aryl hydrocarbon with respect to those of the olefin, to obtain, after recycling said excess, the corresponding mono alkylaryl hydrocarbon.

SUMMARY OF THE INVENTION

The present invention has for subject matter a superalkalinized alkyaryl sulfonate of alkaline earth metal, wherein the aryl radical is other than phenol, the alkyl chain is a linear chain that contains between 14 and 40 carbon atoms, and the aryl sulfonate radical of alkaline earth metal is fixed, in a molar proportion comprised between 0 and 13% in positions 1 or 2 of the linear alkyl chain.

Preferably, the aryl sulfonate radical of alkaline earth metal is fixed, in a molar proportion comprised between 5 and 11% in positions 1 or 2 of the linear alkyl chain, more preferably, between 7 and 10% in positions 1 or 2 of the linear alkyl chain.

Preferably, the aryl radical is either a tolyl, xylyl, o xylyl, ethyl phenyl, or cumenyl radical.

Preferably, the alkyl chain contains between 16 and 30 carbon atoms, more preferably, between 20 and 24 carbon atoms.

The present invention also has for subject matter a new intermediate compound, an alkylaryl hydrocarbon comprising a nonphenyl aryl substituent on a linear alkyl chain containing between 14 and 40 carbon atoms, wherein the molar proportion of aryl substituent on positions 1 and 2 of the linear alkyl chain is comprised between 0 and 13%.

Preferably, the molar proportion of aryl substituent on positions 1 and 2 of the linear alkyl chain is comprised between 5 and 11%, more preferably, between 7 and 10%.

Preferably, the aryl radical is either a tolyl, xylyl, o xylyl, ethyl phenyl, or cumenyl radical.

Preferably, the alkyl chain contains between 16 and 30 carbon atoms, more preferably, between 20 and 24 carbon atoms.

The present invention also has for subject matter a process for the preparation of the alkylaryl hydrocarbon comprising the steps of:

(a) the isomerization of a linear mono-alpha olefin containing between 14 and 40 carbon atoms to produce a linear mono-olefin containing a molar proportion of between 0 and 13% of alpha olefin, (b) the alkylation, by the Friedel-Crafts reaction, of an aryl hydrocarbon other than benzene by the linear mono-olefin.

Preferably, the linear mono-olefin contains a molar proportion of between 5 and 11% of alpha olefin, more preferably, between 7 and 10% of alpha olefin, The present invention also has for subject matter a second process for the preparation of the alkylaryl hydrocarbon comprising the alkylation, by the Friedel-Crafts reaction, of an aryl hydrocarbon other than benzene by a linear mono-olefin containing between 14 and 40 carbon atoms, and having a molar proportion of alpha olefin of at least 80%, wherein the alkylation takes place in a first step in which the molar ratio between the aryl hydrocarbon and the linear mono-alpha olefin is a maximum of 1.5, and in a second step in which said ratio is a minimum of 2. Preferably, the alkylation takes place in a first step in which the molar ratio between the aryl hydrocarbon and the linear mono-alpha olefin is a maximum of 1, and in a second step in which said ratio is a minimum of 5.

The superalkalinized alkylaryl sulfonate of alkaline earth metal can be produced by the sulfonation of the alkylaryl hydrocarbon intermediate produced by either process, and the reaction of the resulting sulfonic acid with an excess of alkaline earth base. The catalyst used in the Friedel-Crafts reaction can be hydrofluoric acid, aluminum chloride, boron fluoride, a sulfonic ion exchange resin, or an acid activated clay.

BRIEF DESCRIPTION OF THE DRAWINGS

In order to assist the understanding of this invention, reference will now be made to the appended drawings. The drawings are exemplary only, and should not be construed as limiting the invention.

DETAILED DESCRIPTION OF THE INVENTION

Figure 1:
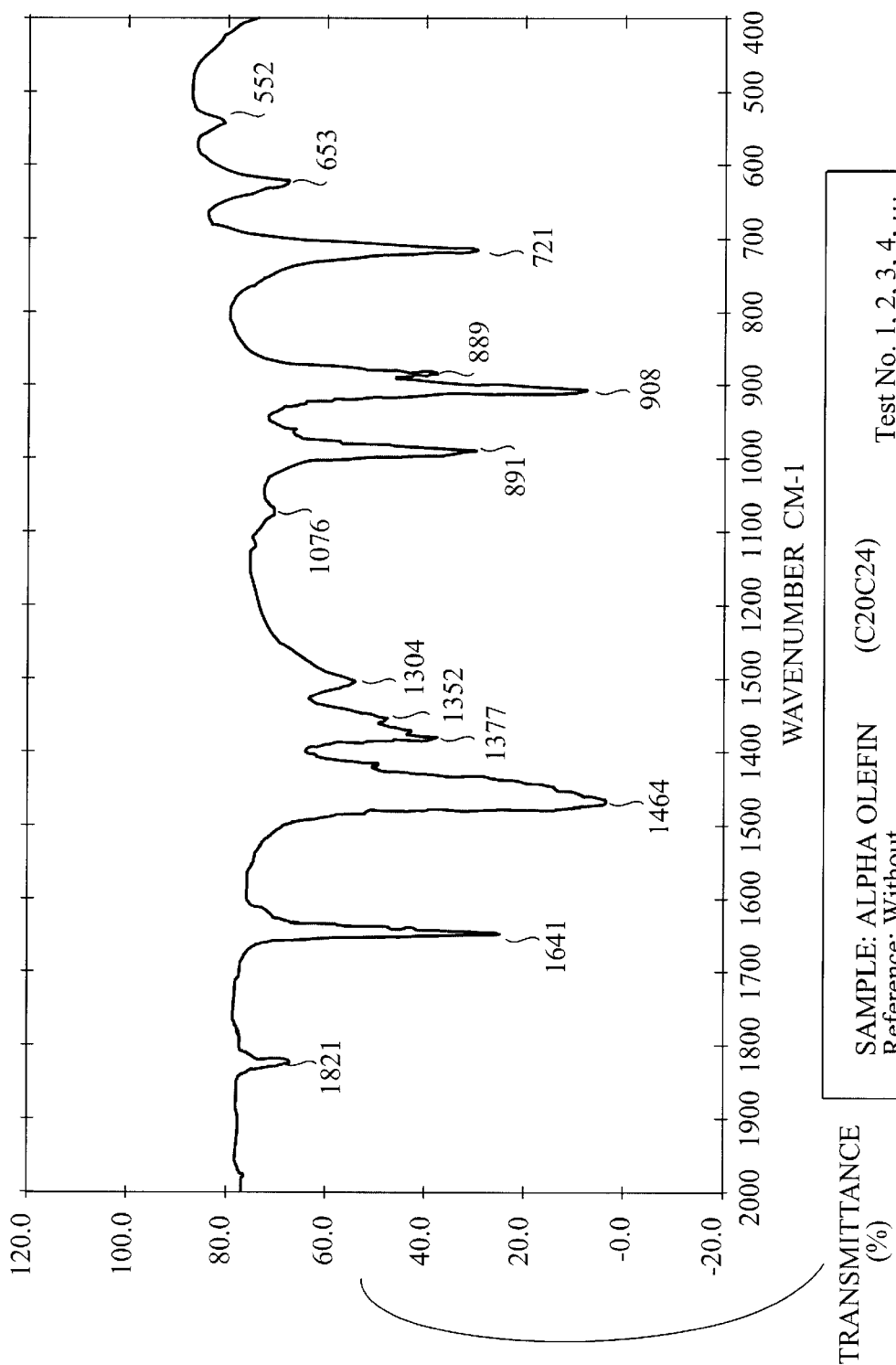
FIG. 1 shows the infrared spectra of a cut of $C_{20}$ to $C_{40}$ linear mono-alpha olefins, obtained directly by the polymerization of ethylene.

The Applicant has found that, by using a linear mono-olefin having a molar proportion of alpha olefin of at least 80%, he obtained, during the alkylation reaction with benzene, an alkylaryl hydrocarbon in which the molar proportion of the phenyl group in positions 1 and 2 of the starting linear olefin chain was at least 25%.

In fact, this high proportion of olefin having a phenyl group in positions 1 and 2 is reflected by a sulfonate which, when prepared by the process described in aforementioned French Patent No. 2.564.830, exhibits hygroscopic properties, such that it forms a superficial 'skin,' making this product unacceptable as an additive for lubricating oil.

The formation of this superficial skin was generally accompanied by a very slow filtration rate, a slight incorporation of calcium, a deterioration in anti rust performance, and the undesirable occurrence of a turbid appearance, indeed of a sedimentation, when the sulfonate thus prepared was added in a proportion of 10% by weight to a standard lubricating oil and stored for examination.

Through identification by chromatography, the Applicant has studied the different isomers, aryl fixed in positions 1, 2 et seq. on a linear mono-olefinic chain, their respective influence on the properties of the corresponding alkylaryl sulfonates of alkaline earth metal obtained from these different isomers.

And he discovered that he could overcome the aforementioned drawbacks, in so far as the molar proportion of aryl hydrocarbon, other than benzene, fixed to the carbon atoms in positions 1 or 2 of the initial linear mono-olefin, was comprised between 0 and 13%, and preferably between 5 and 11% and in particular between 7 and 10%.

Without wishing to be bound by any scientific explanation, it is assumed that the more the aryl hydrocarbon is fixed to a carbon atom located in a position remote from the ends of the hydrocarbon chain of the linear mono-olefin, the more pronounced is the hydrophobic character of the corresponding alkylaryl hydrocarbon, and hence the good properties of the additive in a lubricating oil.

The present invention therefore has for subject matter a superalkalinized alkylaryl sulfonate of alkaline earth metal, in which the aryl radical is other than phenyl and the alkyl chain, which contains between 14 and 40 carbon atoms, is a linear chain, in which the aryl sulfonate radical of alkaline earth metal is fixed, in a molar proportion comprised between 0 and 13%, preferably between 5 and 11%, and particularly between 7 and 10%, in positions 1 and 2 of the linear alkyl chain.

In fact, these alkylaryl sulfonates, particularly those in which the aryl radical is a substituted phenyl radical, preferably a tolyl, xylyl radical, in particular orthexylyl, ethyl phenyl or cumenyl, exhibit a set of properties, including solubility in lubricating oil, filtration rate, incorporation of alkaline earth metal in the medium, anti rust properties and an absence or a delay in the formation of a skin, which makes them particularly attractive as detergent/dispersion additives in this type of oil.

The content of 13% is the threshold above which it is no longer possible to obtain simultaneously a suitable improvement in the aforementioned five properties.

The content of 11% is the upper limit of the additive prepared on the industrial scale, and for which an attempt is made to obtain an alkylaryl sulfonate exhibiting all of these five properties.

The content of 10% is the desired value during the industrial production of this additive.

The present invention also has for subject matter processes for the preparation of such an alkylaryl sulfonate.

A first process according to the invention comprises the alkylation, according to the Friedel-Crafts reaction, of an arylhydrocarbon other than benzene, by a linear mono-olefin, the sulfonation of the alkylaryl hydrocarbon obtained, and the reaction of the resulting sulfonic acid with an excess of alkaline earth base, in which the linear mono-olefin contains a molar proportion comprised between 0 and 13%, preferably between 5 and 11%, and more particularly between 7 and 10% of alpha olefin.

A second process has been developed by the Applicant to obtain superalkalinized alkylaryl sulfonates of alkaline earth metal according to the invention with a mono-alpha olefin.

It consists, in a conventional process comprising the alkylation, by the Friedel-Crafts reaction, of an aryl hydrocarbon other than benzene, by a linear mono-alpha olefin, the sulfonation of the alkylaryl hydrocarbon obtained and the reaction of the resulting sulfonic acid with an excess of alkaline earth base, in splitting the alkylation reaction into a first step in which the molar ratio between the aryl hydrocarbon and the linear mono-alpha olefin is a maximum of 1.5 and preferably 1, and in a second step, in which said ratio is at least 2 and preferably 5.

In both the first and the second processes, the catalyst used for the Friedel-Crafts reaction is selected preferably from among hydrofluoric acid, aluminum chloride, boron fluoride, a sulfonic ion exchange resin, and an acid activated clay.

The conditions of this alkylation reaction are depending upon the nature of the Friedel-Crafts catalyst being used.

Should it be hydrofluoric acid, the temperature is preferably comprised between 20 and 70° C. and the pressure comprised between atmospheric pressure and $10.10^5$ Pa.

Should it be aluminum chloride or boron fluoride, the conditions are those described in the literature in connection with this reaction.

Finally, should it be a solid Friedel-Crafts catalyst, such as a sulfonic ion exchange resin or an acid activated clay, the temperature of the alkylation reaction is comprised between 40 and 250° C. and the pressure between atmospheric pressure and $15.10^5$ Pa.

Although the Applicant does not wish to be bound by any particular explanation, it would appear that the maintenance, at the start of the alkylation reaction, of a molar ratio of aryl hydrocarbon to linear mono-alpha olefin of a maximum of 1.5 and preferably 1, in the presence of a Friedel-Crafts catalyst, causes a migration of the double bond of the linear olefin from the terminal alpha position to a more central position of the olefin, where the aryl radical is fixed.

It is assumed that the alpha olefin reacts with the Friedel-Crafts catalyst to form an intermediate carbonium ion, which is isomerized, said isomerization occurring more easily if the relative proportion of alpha olefin is higher.

The alkylation of this carbonium ion occurs by an aromatic electrophilic substitution reaction in which a hydrogen atom of the aromatic ring is substituted by a carbon atom of the olefinic chain.

This isomerization reaction is unexpected because, hitherto, the highly exothermic alkylation reaction always occurred with a high molar excess of aryl hydrocarbon, both for benzene or one of its derivatives substituted by alkyl radicals, with respect to the initial olefin, whether it is linear alpha olefin or a branched olefin.

It must nevertheless be observed that this first isomerization step must be followed, in the process of the invention, by a second step in which the molar proportion of the aryl hydrocarbon is 2 and preferably 5 times greater than that of the initial linear olefin.

The present invention also has for subject matter the application of the new superalkalinized alkylaryl sulfonates of alkaline earth metal as detergent/dispersant additives for lubricating oils and lubricating oils containing them, in a proportion of between 0.1 and 15% by weight.

The present invention also has for subject matter the alkylaryl hydrocarbons comprising an aryl substituent, other than phenyl, on a linear alkyl chain containing between 14 and 40 carbon atoms, and in which the molar proportion of aryl substituent on the carbon atoms in positions 1 and 2 of the linear alkyl chain is comprised between 0 and 13%, preferably between 5 and 11%, and more particularly between 7 and 10%.

It has also for subject matter processes for the preparation of this alkylaryl hydrocarbon, either by direct reaction of the selected aryl hydrocarbon, according to the Friedel-Crafts reaction, with a linear mono-olefin, of which the molar proportion is comprised between 0 and 13%, preferably between 5 and 11%, and more particularly between 7 and 10% of alpha olefin, or by a reaction of the selected aryl hydrocarbon, according to the Friedel-Crafts reaction, with a linear mono-alpha olefin in two steps, that is to say a first step in which the molar ratio of the aryl hydrocarbon other than benzene to the mono-alpha olefin is a maximum of 1.5 and preferably of 1, and a second step in which said ratio is at least 2 and preferably 5.

It has also for subject matter the application of said alkylaryl hydrocarbons to the preparation of detergent/dispersant additives for lubricating oils.

In connection with the present description, the term of linear mono-alpha olefin denotes a straight chain olefin or a mixture of straight chain olefins, which can be obtained by the oligo polymerization of ethylene, and which contain between 14 and 40, preferably between 16 and 30, and more particularly between 20 and 24 carbon atoms, and in which the molar proportion of mono-alpha olefin is at least 80%.

Specific examples of suitable linear mono-alpha olefins are provided by the $C_{16}$ and $C_{18}$ olefins, by cuts of $C_{14}$ to $C_{16}$, $C_{14}$ to $C_{18}$, $C_{16}$ to $C_{18}$ or C20 to $C_{24}$ olefins, or by combinations of some of them.

The $C_{14}$ to $C_{40}$ linear mono-alpha olefins, which can be obtained by the direct oligo polymerization of ethylene, have an infrared absorption spectrum that exhibits an absorption peak at 908 $cm^{-1}$, characteristic of the presence of the ethylene double bond at the end of the chain, with the carbon atoms occupying positions 1 and 2 of the olefin; also distinguished therein are two other absorption peaks at wavelengths of 991 and 1641 $cm^{-1}$.

By contrast, the isomerized $C_{14}$ to C40 linear mono-olefins, that is to say in which the molar proportion of alpha olefin is comprised between 0 and 13% preferably between 5 and 11%, and more particularly between 7 and 10%, have an infrared absorption spectrum that exhibits no peak in the regions of 908, 991 and 1641 $cm^{-1}$, but which reveals the appearance of an absorption peak at 966 $cm^{-1}$, characteristic of a trans internal ethylene double bond.

These isomerized mono-olefins may be obtained by heating, under atmospheric pressure at a temperature of about 120° C., during a period of 144 hours, a cut of $C_{20}$ to $C_{24}$ alpha mono-olefins, obtained by polymerization of ethylene, upon a catalyst based upon pentacarbonyl iron, for instance as disclosed in U.S. Pat. No. 5,320,762, which is incorporated by reference for all purposes.

Figure 2:
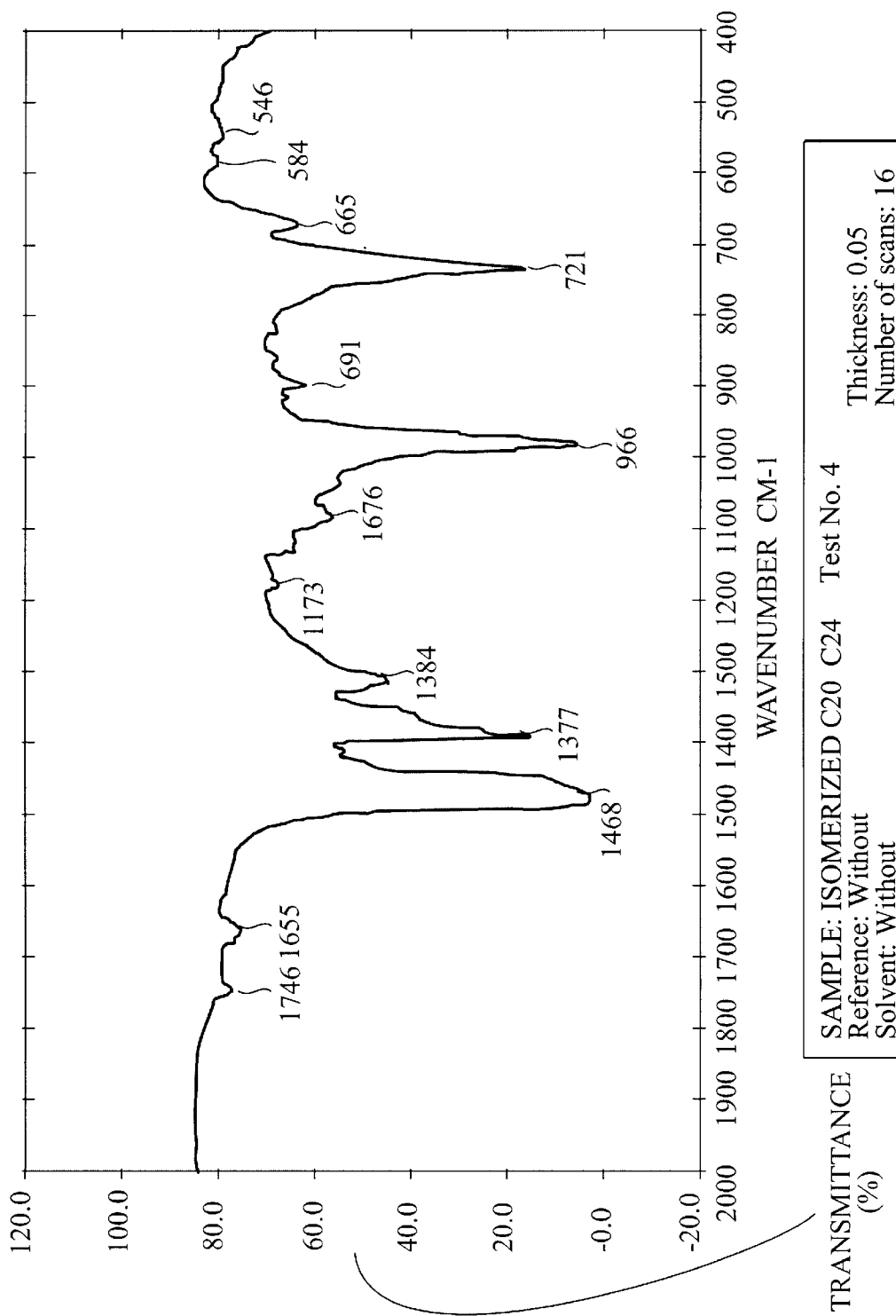
FIG. 2 shows the infrared spectra of a cut of $C_{20}$ to $C_{40}$ linear mono-alpha olefins, obtained by the polymerization of ethylene and after the isomerization of this cut, by passage on a pentacarbonyl iron catalyst, to reduce its molar content of alpha olefin to less than 10%.

FIGS. 1 and 2 herein illustrate this difference, by showing the infrared spectra of a cut of $C_{20}$ to $C_{40}$ linear mono-alpha olefins, obtained directly by the polymerization of ethylene, in FIG. 1, and after the isomerization of this cut, by passage on a pentacarbonyl iron catalyst, to reduce its molar content of alpha olefin to less than 10%, in FIG. 2.

The aryl hydrocarbons with which these linear olefins are reacted may be aromatic hydrocarbons, substituted by at least one $C_1$ to $C_5$ alkyl radical and in particular benzenic hydrocarbons substituted by one or two $C_3$ to $C_{10}$ alkyl radicals. It is much more preferable to use alkyl derivatives of benzene, such as toluene, xylenes and particularly ortholene, ethyl benzene and cumene, because they favor the mono alkylation by the linear mono-olefin according to the Friedel-Crafts reaction, due to the presence of the substituents already present on the aromatic ring.

The Friedel-Crafts catalysts used in the alkylation reaction in one or two steps according to the invention are conventional catalysts, and may include in particular hydrofluoric acid, boron fluoride $BF_3$, aluminum chloride $AlCl_3$, a sulfonic ion exchange resin, or an acid activated day.

The two step alkylation reaction of the present invention can be carried into practice continuously in two successive reactors in the presence of the catalyst.

In the first reactor, the molar proportion of aryl hydrocarbon with respect to the linear olefin is a maximum of 1.5 and preferably 1.2, and more preferably 1, to slow down the alkylation reaction and to favor the isomerization of the initial linear mono-alpha olefin by the migration of its double bond towards the middle of the hydrocarbon chain of the olefin.

In the second reactor, the molar proportion of aryl hydrocarbon with respect to the linear mono-alpha olefin is increased to a minimum of 2/1, and preferably of 5/1 or more, to complete the alkylation reaction.

And at the end of the successive passage in the two reactors, the Friedel-Crafts catalyst is collected by phase separation, and the excess aryl hydrocarbon is recovered, as in the previous processes.

The same result can also be obtained by carrying out separately the isomerization of the initial linear alpha olefin, and then by adding the aryl hydrocarbon to carry out the catalytic alkylation reaction, with a Friedel-Crafts catalyst.

The alkylation product obtained at the end of the alkylation reaction of either process according to the present invention is a new intermediate product, which is characterized in particular by its low molar proportion, comprised between 0 and 13%, of aryl isomer fixed to the carbon atoms in position 1 or 2 of the initial linear mono-olefinic chain.

The analysis of the alkylation products, which are the subject matter of the present invention, requires not only infrared spectrography, but also gas chromatography.

The latter technique, carried out on a semi capillary column, can be used to separate and to calculate the proportion of each of the isomers.

The chromatograms obtained by this technique reveal the absence of 1 aryl isomer. The peak corresponding to the longest retention time is that of the 2 aryl isomer. The peak with the longest retention time less one is that of the 3 aryl isomer, the peak of the longest retention time less two is that of the 4 aryl isomer, and the following peak, considering the length of the column used (15 m), is the most pronounced because it combines most of all the other isomers in which the aryl group is fixed to carbon atoms in position 4, 5 et seq. of the linear alkyl chain.

Figure 3:
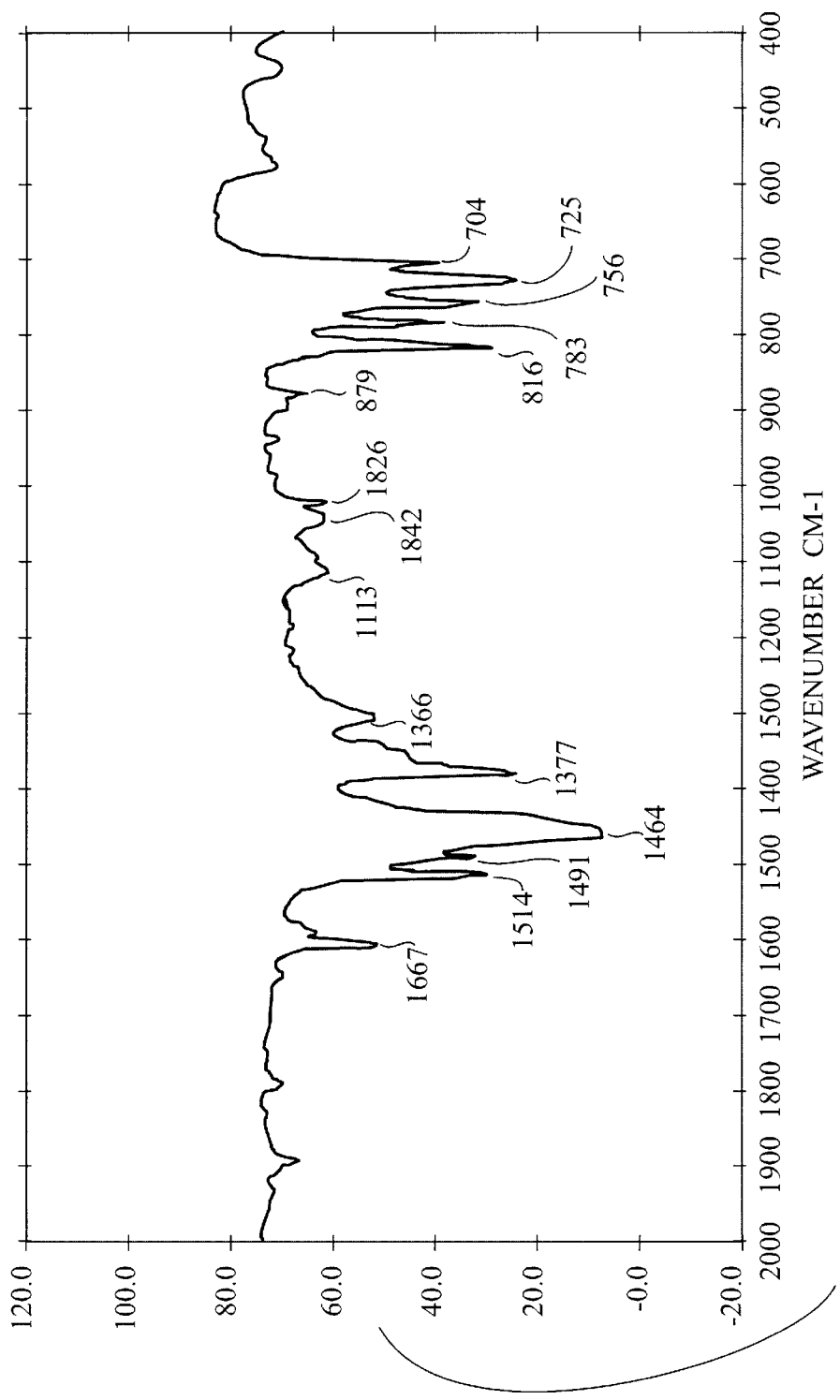
FIG. 3 shows the infrared spectrum of an alkylaryl hydrocarbon of the invention.
Figure 4:
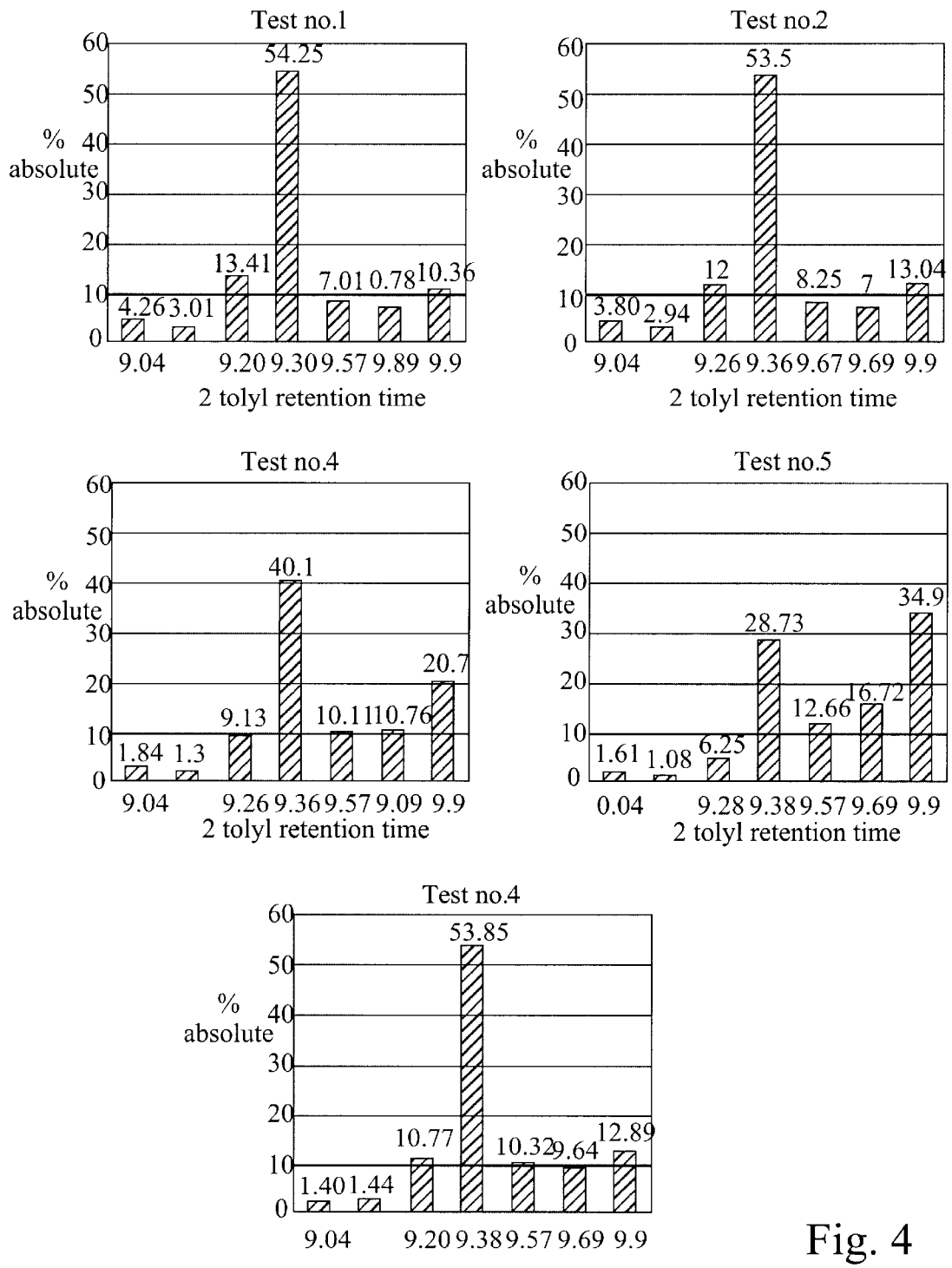
FIG. 4 shows a series of diagrams, illustrating the integration of the gas chromatogram peaks of the same hydrocarbons, in the form of molar proportions in percent as a function of retention times in minutes.

FIG. 3 shows the infrared spectrum of an alkylaryl hydrocarbon of the invention, and FIG. 4 shows a series of diagrams, illustrating the integration of the gas chromatogram peaks of the same hydrocarbons, in the form of molar proportions in per cent as a function of retention times in minutes.

The preferred alkylation products are those resulting from the alkylation of alkyl derivatives of benzene, such as toluene, xylenes, and particularly orthoxylene, ethyl benzene and cumene.

The following sulfonation step of the process according to the invention is carried out by techniques known in themselves, for example by reaction of the product of the alkylation step, with concentrated sulfuric acid, with an oleum or with sulfuric anhydride dissolved in sulfurous anhydride. This sulfonation reaction can also be carried out by contacting the reagents (alkylate and sulfuric anhydride) in the form of a film in co current or counter current flow. After sulfonation, the sulfonic acid can be purified by conventional techniques, such as washing with water or thermal treatment, under stirring with nitrogen bubbling.

The final step of the reaction of sulfonic acid with an excess of alkaline earth base can be carried out by the addition of an oxide or hydroxide of alkaline earth metal, such as magnesium, calcium or barium, and particularly lime.

This neutralization reaction is carried into practice in a dilution oil, with an alcohol having a boiling point above 80° C. and preferably with a carboxylic acid containing 1 to 4 carbon atoms, in the presence of water, as described in particular in aforementioned French Patent Application No. 2.564.830.

Among the alcohols with boiling points above 80° C., the preferable choice is the linear or branched aliphatic mono alcohols containing 4 to 10 carbon atoms, such as isobutanol, 2 ethyl hexanol and $C_8$ to $C_{10}$ oxo alcohols.

Among the carbolic acids that can be employed are preferably formic acid, acetic acid and their mixtures.

Among the dilution oils that are suitable for the neutralization step are paraffinic oils such as Neutral 100 oil, as well as naphthenic or mixed oils.

For the reaction conditions, such as the proportions of reagents and the conditions of temperature and pressure, reference is explicitly made to those described in the prior art and particularly in the French Patent Application No. 2.564.830 of the Applicant.

After the water and alcohol are removed, the product is filtered to remove solid matter and the alkylaryl sulfonate of alkaline earth metal obtained is collected.

The alkylaryl sulfonates, according to the invention may be weakly or strongly superalkalinized, i.e. their base number (BN) according to Standard ASTM D2896, may be from 10 to 500 and they may be used as detergent/dispersant additives for lubricating oils.

The alkylaryl sulfonates, according to the invention are however especially of interest, when their base number is weak and corresponds to a BN range comprised between 10 and 40.

For this very reason, the present invention will be illustrated with examples wherein, during the reaction of the sulfonic acid with an alkaline-earth base, the aim is to obtain an alkylaryl sulfonate exhibiting a BN of about 20.

If an alkylation product of benzene is used, the Applicant has found that the formation of a skin could be avoided, and that it was necessary to add calcium chloride during the sulfonation reaction to decrease the viscosity of the reaction medium.

If, however, the alkylation product has been obtained by the alkylation of an aryl hydrocarbon already substituted by at least one alkyl group, such as toluene, ethyl benzene, orthoxylene and cumene, it is no longer necessary to add calcium or ammonium chloride, and the formation of a skin can be avoided during the outdoor storage of the sulfonate, in so far as the content of aryl isomers fixed in positions 1 and 2 is comprised between 0 and 13 mole %.

Said detergent/dispersant additives can be added to the lubricating oils in quantities of up to 15% by weight according to the type of lubricating oil concerned.

The lubricating oils to which the sulfonates of the present invention can be added may be lubricating oils with a naphthenic, paraffinic or mixed base. They may consist of mineral oils or be obtained from coal distillation products or may consist of synthetic oils, such as polymers of alkylenes or esters of inorganic acids or of carboxylic acids.

EXAMPLES

The invention will be further illustrated by following examples, which set forth particularly advantageous method embodiments. While the Examples are provided to illustrate the present invention, they are not intended to limit it.

Example 1

Example 1 represents the preferred embodiment.

(a) Alkylation

In a first 1.15 liter reactor, stirred and heated by double jacket to 64° C., an HF catalyst was loaded continuously at 33 cm$^3$/min, a $C_{20}$ to $C_{24}$ normal linear mono-alpha olefin with an infrared spectrum shown in FIG. 1 at the rate of 37.5 cm$^3$/min, and toluene at the rate of 12.86 cm$^3$/min.

These operating conditions correspond to an HF catalyst/alpha olefin ratio of 1.2 in moles, and a residence time of 13.8 min.

In a second 1.15 liter reactor, stirred and heated by double jacket to 60° C., the product from the first reactor was then introduced, the same HF catalyst at the rate of 19.87 cm$^3$/min and toluene at the rate of 51.64 cm$^3$/min.

These operating conditions correspond to an HF catalyst/alpha olefin ratio of 1.41 by volume and a total toluene/alpha olefin ratio of 6.

An unheated settler is used to recover the organic phase and to recycle a portion of the HF catalyst to the first reactor.

The pressure in both reactors and in the settler was maintained at 5×10$^5$ Pa.

The excess toluene is then distilled by passage through a preheater at 120° C., and introduction into the bottom of a column at 280° C.

During this second alkylation phase, the process was continuous, with the product passing from the first reactor to the second, and then to the settler, and finally to the preheater and to the column to remove the toluene.

The alkylate obtained exhibits an infrared spectrum shown in FIG. 3.

Its gas chromatogram, shown in FIG. 4, was obtained on a Carlo Erba Series Vega 6000 instrument, equipped with a 15 m long semi-capillary column, with an SPB 5 Supelco stationary phase with flame ionization detector, with the heater and column temperatures varying from 70 to 320° C. with a programming of 20° C./min and a final plateau of 10 min.

(b) Sulfonation

The sulfuric anhydride used for the sulfonation of the alkylate is obtained by the oxidation of $SO_2$ in a furnace at 450° C. with vanadium oxide as catalyst.

The sulfonation reaction takes place in a tube maintained at 65° C. by falling film, the sulfuric anhydride being diluted with nitrogen and the alkylate/$SO_3$ molar ratio being maintained at 1.05.

The residual sulfuric acid was then removed by thermal treatment after dilution with 10% of 100 N oil, nitrogen bubbling at the rate of 10 l/h per kg of product and stirring at 85° C., until a lower residual $H_2SO_4$ content was obtained (maximum 0.5%).

(c) Superalkalinization

In this step, relative molar propositions of $Ca(OH)_2$ and sulfonic acid are reacted, so as to obtain a proportion of 35% of lime which is not neutralized by the sulfonic acid in the final product. It is this proportion of 35% of lime not neutralized, which will enable to obtain in the final sulfonate a BN of the order of 20 according to the Standard ASTM D 2896.

To do so, it is added an amount of $Ca(OH)_2$, which does not correspond to the stoechiometric neutralisation of the amount of sulfonic acid entering into reaction, i.e. 0,5 mole of $Ca(OH)_2$, per mole of sulfonic acid, but an excess of $Ca(OH)_2$, with regard to this stoechiometric amount, i.e. a proportion of 0.77 mole of $Ca(OH)_2$ per mole of sulfonic acid, in order to obtain a BN of around 20.

These superalkalinisation conditions, which will be followed in all the examples 1 through 22 of the present patent application, are carried out in the present example 1 as follows.

In a four necked 4 liter reaction vessel, which may be stirred, heated and equipped with a system enabling the removal of water and ethylhexanol by distillation, is charged a premix containing:

578 g of a 100 Neutral oil
65.7 g (0.89 mole) of lime $(CaOH)_2$ and
a 10% by weight solution of an anrifoam agent SI200, marketed by Rhone Poulenc in dodecylbenzene.

The medium is heated to 60° C. in 5 minutes with stirring at 400 r.p.m.; 609.7 g (1.15 moles) of the sulfonic acid obtained during the previous step and heated at 60° C. was introduced over a period of 30 minutes.

After this addition, the temperature is increased, over a period of 10 minutes, to 93° C. A plateau of 15 minutes is observed at that temperature; then the medium is cooled at 85° C. by addition of fresh 2-ethyl hexanol (100.7 g). The medium is maintained at this temperature during 15 minutes and during this period, 23 g of water then 4.5 g of formic acid and 4.5 g of acetic acid have been added.

The vessel is heated at 100° C. over a period of 15 minutes and maintained at this temperature for 1 hour and 30 minutes.

Then it is heated at 120° C. over a period of 15 minutes and maintained at this temperature for 1 hour.

The first step of the reaction having been carried out at atmospheric pressure, the vacuum is progressively applied by heating to 195° C. The medium is then maintained for one hour in the following final conditions: 195° C. and $4 \times 10^3 Pa$ (30 mm Hg).

The percentage of gross sedimentation is 0.4%.

The analysis and filtration rate are shown in the table (page 1/4).

Examples 2 to 22

In the following examples, the alkylation reaction was carried out by alkylation of different aromatic hydrocarbons with a linear mono-olefin, identified respectively in the first and second lines of the table below.

The alkylation conditions appear in the following lines of the table, which show the type of catalyst, the number of identical 1.15 liter reactors into which the reaction mixture passes in succession, and the relative proportions of catalyst with respect to the olefin (by volume or by weight) and of aromatic hydrocarbon with respect to the olefin (in moles) for each of the reactors.

The alkylaryl hydrocarbon obtained or alkylate is then analyzed, indicating the percentage of olefins (by weight) which has not reacted, the molar proportion of isomers in which the aryl radical is fixed in positions 1 and 2 of the initial olefin with respect to all the isomers, and their viscosity at 40 and 100° C.

The table then shows the result of analyses of the sulfonic acid obtained by the falling film technique, the sulfuric anhydride and alkylate being introduced in co current at the top of a tube, the corresponding sulfuric acid being collected at the bottom of the tube, and the residual sulfonic acid being removed by thermal treatment.

The table terminates with the results of analyses carried out on calcium alkylaryl sulfonates, prepared by the process described in example 1 above and it shows the contents of total calcium (CaT) and soluble calcium (CaS), in weight percentages, and the base number BN, measured according to Standard ASTM D2896.

The appearance is evaluated by mixing 10 g of calcium alkylaryl sulfonate in 90 g of 600 N oil and by attributing to time t=0 and to the expiration of a period of one month of storage a figure from 1 to 6, where 1 indicates a clear solution, 2 the presence of a slight turbidity and 3 the presence of turbidity, 4 the appearance of a deposit, 5 the presence of a deposit, and 6 the presence of a large deposit.

The viscosity is measured at 100° C. after dilution of the product in 100 N oil until the solution obtained has a total calcium content of 2.35%.

The next line of the table shows the gross weight percentage of the sediments measured by method ASTM D2273 in which 25 cm³ of the product is diluted in a flask with gasoline up to 100 cm³, after which the reading of the percentage of sediments is made after centrifugation of the flask.

The filtration rate is then given in kg/in per $m^2$.

The last line of the table indicates the formation or absence of skin with a sample of 30 cm³ of sulfonate, placed in a 100 cm³ beaker, on the expiration of a period of one month, with indication of the number of days in cases in which the skin has appeared.

The anti rust tests, which are not shown in the table, were carried out in each of the samples with sea water, using a method very similar to method ASTM D665, and helped to confirm visually the good anti rust properties of the alkylaryl sulfonates of the invention.

Examples 1 and 2 of the invention should be compared with Example 3, which is not of the invention.

Example 4 is the only example that carried the invention into practice with a mixture of $C_{20}$ to $C_{24}$ linear mono-olefin which is not a linear mono-alpha olefin but an isomer or a mixture of isomers having a maximum molar content of 13% of terminal ethylene double bond. The olefin of this example was obtained by isomerization of a linear mono-alpha olefin on a pentacarbonyl iron $Fe(CO)_5$ catalyst, and its infrared spectrum, shown in FIG. 2, was used to confirm the disappearance of the absorption band at 908 $cm^{-1}$, characteristic of the terminal carbon/carbon double bond.

In Example 4 and comparative Example 5, the alkylation reaction has been carried out with a single reactor on a Friedel-Crafts catalyst of the montmorillonite clay type activated with acid and marketed under the trade mark Fulcat 22B.

In these examples 4 and 5, the alkylation reaction is carried out as follows:

In a four necked, 4 liter reaction vessel, which may be stirred, heated and equipped with a condensate separator under a vertical refrigering apparatus, are charged:

920 g of toluene (10 moles), 584 g of a $C_{20-24}$ linear olefin (2 moles) olefin isomerized upon pentacarbonyl iron for example 4 and unisomerized alpha olefin for example 5) and 58 g of Fulcat 22B (10% by weight with regard to the olefin).

The vessel is heated under reflux at 122° C. during 3 hours and 30 minutes under atmospheric pressure. The catalyst is removed by filtration and a distillation is made for removing the excess of toluene during a period of 1 hour at 190° C. under $12.10^3 Pa$ (90 mm Hg).

The gas chromatograms of the alklwates of Examples 1 to 5, measured as described concerning Example 1, are shown in FIG. 4 with the test numbers corresponding to each of these examples.

In the diagrams in FIG. 4, the y-axis shows the percentage of each tolyl eicosane isomer, each of them corresponding to a position of the tolyl eicosane radical on the alkyl chain, all these isomers being related to 100%, and on the x-axis the retention times in minutes.

It is known from the literature that the isomers having the aryl group furthest from the end of the alkyl chain have the shortest retention times, and for the same number of carbons.

On each of the test results in FIG. 4, the 2-tolyl-eicosane ($C_{20}$) isomer corresponds to the longest retention time of 9.9 min. the 3-tolyl-eicosane isomer to the retention time of 9.69 min. the 4 tolyl eicosane isomer to the retention time of 9.57 min. and all the 5-, 6-, 7-, 8-, 9- and 10-tolyl eicosane isomers are grouped at the intermediate retention time between 9.04 and 9.57 min with a majority peak at 9.38 min.

It may be observed that the progression of the contents of the 3- and 4-tolyl-eicosane isomers follows that of the 2-tolyl-eicosane isomer, and that only tests Nos. 1, 2 and 4, corresponding to a molar content of less than 13%, correspond to alkylaryl hydrocarbons of the present invention.

The comparative Examples 6 and 8 can be compared respectively with Examples 7 and 9 of the invention, and illustrate the carrying into practice of the invention with C18 and C16 linear mono-alpha olefins.

Comparative Example 8 was carried out with an alkylation reaction on sulfonic ion exchange resin marketed by the company Rohm and Haas under the name of Amberlyst 36 Dry.

The following examples illustrate the use of different aromatic hydrocarbons, namely ethyl benzene in Examples 10 and 11, benzene in comparative Examples 12 and 13, orthoxylene in Examples 14 and 15, a mixture of ortho, meta and para xylenes in Examples 16 and 17, and cumene in Examples 18 and 19.

Comparatives Examples 20 and 21 show the use of a $C_{18}$ linear mono-alpha olefin and comparative Example 22 a $C_{16}$ linear mono-alpha olefin.

The results show the impossibility of obtaining a superalkalinized calcium alkylaryl sulfonate having acceptable properties if the aryl radical is benzene, because it was never possible to prevent the formation of a skin with the use of this aromatic hydrocarbon, even if an attempt was made to alkylate it with a linear mono-olefin having a long chain length and a high degree of isomerization.

On the contrary, with toluene, alkylaryl sulfonates are obtained having encouraging performance characteristics.

The same may be said of the other alkyl derivatives of benzene, but problems connected with the difficulty of reducing the value of sulfuric acid to a content lower than 0.5% during the thermal treatment appear with the different xylenes.

As to ethyl benzene and cumene, they help to mask slightly the effect of the degree of isomerization of the olefin due to the beneficial influence of the size of the aromatic ring on the performance of the corresponding superalkalinized calcium alkylaryl sulfonate.

TABLE

| | | Test No. | | | | | |
|---|---|---|---|---|---|---|---|
| | | 1 | 2 | 3 | 4 | 5 | 6 |
| Alkylation | Aromatic | Toluene | Toluene | Toluene | Toluene | Toluene | Toluene |
| | Linear Olefin | $C_{20-34}$ | $C_{20-34}$ | $C_{20-34}$ | $C_{20-34}$ isomerized | $C_{20-34}$ | $C_{18}$ |
| Alkylation Conditions | Catalyst | HF | HF | HF | Fulcat 22B* | Fulcat 22B* | HF |
| Reactor 1 | Catalyst/Olefin | 0.88 (Vol.) | 0.88 (Vol.) | 0.88 (Vol.) | 0.1 (Wt.) | 0.1 (Wt.) | 0.88 (Vol.) |
| | Aromatic/Olefin (mol) | 1.2 | 1.5 | 5 | 5 | 5 | 5 |
| Reactor 2 | Catalyst/Olefin (Vol.) | 1.41 | 1.41 | 1.41 | — | — | 1.41 |
| | Total Aromatic/ Olefin (mol) | 6 | 6 | 6 | — | — | 6 |
| Analyses of alkylate | % Unreacted Olefins (Wt.) | 0.1 | 0.2 | 0.2 | 1 | 1 | 0.18 |
| | Positions 1 and 2 Σ position (mol) | 0.104 | 0.126 | 0.207 | 0.129 | 0.349 | 0.28 |
| | Viscosity 100° C. (cSt) | 4.44 | 4.47 | 4.5 | 3.71 | 3.77 | 3.57 |
| | 40 ° C. | 21.8 | 21.8 | 22.6 | 16.8 | 16.3 | 15.8 |

TABLE-continued

|  |  | Test No. | | | | | |
|---|---|---|---|---|---|---|---|
|  |  | 1 | 2 | 3 | 4 | 5 | 6 |
| Analyses of sulfonic acid after thermal treatment | % $HSO_3$ (Wt.) | 14.5 | 13.35 | 14.00 | 15.83 | 13.3 | 16.39 |
|  | % $H_2SO_4$ (Wt.) | 0.21 | 0.2 | 0.14 | 0.42 | 0.4 | 0.07 |
| Analyses of sulfonate | % CaT (Wt.) | 2.43 | 2.53 | 2.42 | 2.46 | 2.48 | 2.38 |
|  | % CaS (Wt.) | 1.65 | 1.96 | 1.75 | 1.70 | 1.86 | 1.72 |
|  | BN (D2895) | 21.2 | 18.8 | 19.8 | 21.3 | 15.5 | 16.2 |
|  | Appearance t = 0 | 1 | 1 | 1 | 1 | 2 | 1 |
|  | 600N t = 1 month | 1 | 1 | 5 | 1 | 6 | 2 |
|  | Viscosity at 100 °C. at 2.35% Ca (cSt) | 18.2 | 51.15 | 31.2 | 14.95 | 24.8 | 30.8 |
|  | % Gross sedimentation (wt.) | 0.4 | 0.35 | 0.75 | 0.4 | 17 | 14 |
|  | Filtration rate (kg/h per m²) | Fast 1500 | Slow 100 | Slow 35 | Medium 773 | Very slow 10 | Slow 50 |
|  | Skin formation in open air | No | No | YES after 15 days | NO | YES after one day | YES after 25 days |

*Acid-activated monomorillonite clay from Laporte.

TABLE

|  |  | Test No. | | | | | |
|---|---|---|---|---|---|---|---|
|  |  | 7 | 8 | 9 | 10 | 11 | 12 |
| Alkylation | Aromatic | Toluene | Toluene | Toluene | Ethyl benzene | Ethyl benzene | Benzene |
|  | Linear Olefin | $C_{18}$ | $C_{18}$ | $C_{18}$ | $C_{20-24}$ | $C_{20-24}$ | $C_{18}$ |
| Alkylation Conditions | Catalyst | HF | Amberlyst* 36 Dry | HF | HF | HF | HF |
| Reactor 1 | Catalyst/Olefin | 0.88 (Vol.) | 0.1 (Wt.) | 0.88 (Vol.) | 0.88 (Vol.) | 0.88 (Vol.) | 0.88 (Vol.) |
|  | Aromatic/Olefin (mol) | 1.2 | 5 | 1.2 | 5 | 1.2 | 5 |
| Reactor 2 | Catalyst/Olefin (Vol.) | 1.41 | — | 1.41 | 1.41 | 1.41 | 1.41 |
|  | Total Aromatic/Olefin (mol) | 5.8 | — | 5.8 | 6 | 5.8 | 5.9 |
| Analyses of alkylate | % Unreacted Olefins (Wt.) | 0.33 | 0.92 | 0.29 | 1.79 | 2.01 | 0.56 |
|  | Positions 1 and 2 Σ position (mol) | 0.064 | 0.35 | 0.072 | 0.187 | 0.083 | 0.15 |
|  | Viscosity 100 °C. (cSt) | 3.2 | 2.9 | 2.9 | 4.8 | 4.55 | 4.8 |
|  | 40 °C. | 14.5 | 11.3 | 12.7 | 22.1 | 21 | 18.4 |
| Analyses of sulfonic acid after thermal treatment | % HSO3 (Wt.) | 16.59 | 17.33 | 17.5 | 14.1 | 14.11 | 18 |
|  | % H2SO4 (Wt.) | 0.38 | 0.3 | 0.05 | 0.4 | 0.52 | 0.23 |
| Analyses of sulfonate | % CaT (Wt.) | 2.47 | 2.17 | 2.5 | 2.41 | 2.43 | 2.6 |
|  | % CaS (Wt.) | 1.7 | 1.7 | 1.71 | 1.66 | 1.68 | 1.96 |
|  | BN (D2896) | 19.9 | 15.1 | 19.9 | 19 | 19.1 | 18 |
|  | Appearance t = 0 | 1 | 2 | 1 | 1 | 1 | 1 |
|  | 600N t = 1 month | 1 | 2 | 1 | 1 | 1 | 2 |
|  | Viscosity at 100° C. at 2.35% Ca (cSt) | 20.4 | 25.6 | 21.5 | 27.5 | 19.25 | 451 |
|  | % Gross sedimentation (wt.) | 1 | 8 | 0.5 | 12 | 4 | 1 |
|  | Filtration rate (kg/h per m2) | 3500 | 30 | 2700 | 30 | 200 | 10 |
|  | Skin formation in open air | NO | TES after 20 days | NO | YES after 3 days | NO | YES after 1 day |

*Sulfonic ion exchange resin from Rōhm and Hass

TABLE

|  |  | Test No. | | | | | |
|---|---|---|---|---|---|---|---|
|  |  | 13 | 14 | 15 | 16 | 17 | 18 |
| Alkylation | Aromatic | Benzene | Ortho-xylene | Oroth-xylene | o. m. p xylenes | o. m. p xylenes | Cumene |
|  | Linear Olefin | C20–24 | C20–24 | C20–24 | C20–24 | C20–24 | C20–24 |

TABLE-continued

|  |  | Test No. | | | | | |
| --- | --- | --- | --- | --- | --- | --- | --- |
|  |  | 13 | 14 | 15 | 16 | 17 | 18 |
| Alkylation Conditions | Catalyst | HF | HF | HF | HF | HF | HF |
| Reactor 1 | Catalyst/Olefin | 0.88 | 0.88 | 0.88 | 0.88 | 0.88 | 0.88 |
|  | Aromatic/Olefin (mol) | 1.2 | 5 | 1.2 | 5 | 1.2 | 5 |
| Reactor 2 | Catalyst/Olefin (Vol.) | 1.41 | 1.41 | 1.41 | 1.41 | 1.41 | 1.41 |
|  | Total Aromatic/Olefin (mol) | 5.8 | 6 | 5.8 | 6 | 5.8 | 6 |
| Analyses of alkylate | % Unreacted Olefins (Wt.) | 0.39 | 0.26 | 0.82 | 0.7 | 1.12 | 3.97 |
|  | Positions 1 and 2 $\Sigma$ position (mol) | 0.093 | 0.287 | 0.1 | 0.17 | 0.09 | 0.134 |
|  | Viscosity 100 °C. (cSt) | 4 | 5.59 | 5.5 | 5.08 | 5 | 4.82 |
|  | 40 °C. | 17 | 30.41 | 31.5 | 25.35 | 24.8 | 28.9 |
| Analyses of sulfonic acid after thermal treatment | % HSO3 (Wt.) | 15.4 | 13.48 | 13.24 | 13.5 | 13.3 | 12.67 |
|  | % H2SO4 (Wt.) | 0.18 | 0.83 | 0.9 | 1.05 | 0.8 | 0.53 |
| Analyses of sulfonate | % CaT (Wt.) | 2.64 | 2.56 | 2.57 | 2.5 | 2.48 | 2.13 |
|  | % CaS (Wt.) | 1.83 | 1.74 | 1.66 | 1.89 | 1.67 | 1.63 |
|  | BN (D2896) | 19.4 | 15.5 | 19 | 12.5 | 14.2 | 15.5 |
|  | Appearance t = 0 | 1 | 1 | 1 | 1 | 1 | 1 |
|  | 600N t = 1 month | 1 | 1 | 1 | 2 | 1 | 1 |
|  | Viscosity at 100 °C. at 2.35% Ca (cSt) | 46.4 | 20.1 | 16.2 | 26.3 | 21.7 | 18.8 |
|  | % Gross sedimentation (wt.) | 0.6 | 0.4 | 1.4 | 10 | 6 | 1.6 |
|  | Filtration rate (kg/h per m2) | 710 | 1420 | 1450 | 40 | 1000 | 30 |
|  | Skin formation in open air | YES after one day | YES after 10 days separation | NO | YES after 10 days separation | NO | NO |

TABLE

|  |  | Test No. | | | |
| --- | --- | --- | --- | --- | --- |
|  |  | 19 | 20 | 21 | 22 |
| Alkylation | Aromatic | Cumene | Benzene | Benzene | Benzene |
|  | Linear Olefin | C20–24 | C18 | C18 | C18 |
| Alkylation Conditions | Catalyst | HF | HF | HF | HF |
| Reactor 1 | Catalyst/Olefin | 0.88 | 0.88 | 0.88 | 0.88 |
|  | Aromatic/Olefin (mol) | 1.2 | 5 | 1.2 | 1.2 |
| Reactor 1 | Catalyst/Olefin (Vol.) | 1.41 | 1.41 | 1.41 | 1.41 |
|  | Total Aromatic/Olefin (mol) | 5.8 | 6 | 5.8 | 5.8 |
| Analyses of alkylation | % Unreacted Olefins (Wt.) | 7.6 | 0.15 | 0.67 | 0.64 |
|  | Positions 1 and 2 $\Sigma$ position (mol) | 0.054 | 0.169 | 0.068 | 0.08 |
|  | Viscosity 100 °C. (cSt) | 4.59 | 3.14 | 2.9 | 2.5 |
|  | 40 °C. | 27.9 | 13.2 | 11.6 | 9.74 |
| Analyses of sulfonic acid after thermal treatment | % HSO3 (Wt.) | 11.83 | 15.88 | 14.1 | 17.64 |
|  | % H2SO4 (Wt.) | 0.43 | 0.18 | 0.12 | 0.02 |
| Analyses of sulfonate | % CaT (Wt.) | 2.54 | 3.33 | 3.19 | 2.57 |
|  | % CaS (Wt.) | 1.7 | 1.82 | 1.88 | 1.95 |
|  | BN (D2896) | 22.5 | 22.5 | 22 | 24.3 |
|  | Appearance t = 0 | 1 | 2.5 | 2 | 2 |
|  | 600N t = 1 month | 1 | 6 | 3 | 3 |
|  | Viscosity at 100 °C. at 2.35% Ca (cSt) | 16.8 | 255 | 1300 | >2000 |
|  | % Gross sedimentation (wt.) | 0.4 | 1 | 0.8 | 0.75 |
|  | Filtration rate (kg/h per m2) | 33 | Impossible | Impossible | Impossible |
|  | Skin formation in open air | NO | YES after one day of frost | YES after one day of frost | YES after one day of frost |

While the present invention has been described with reference to specific embodiments, this application is intended to cover those various changes and substitutions that may be made by those skilled in the art without departing from the spirit and scope of the appended claims.

What is claimed is:

1. A process for the preparation of an alkylaryl hydrocarbon comprising an aryl substituent other than phenyl on a linear alkyl chain containing between 14 and 40 carbon atoms, wherein the molar proportion of aryl substituent on positions 1 and 2 of the linear alkyl chain is comprised between 0 and 13%, said process comprising the steps of:
   (a) the isomerization of a linear mono-alpha olefin containing between 14 and 40 carbon atoms to produce a linear mono-olefin containing a molar proportion of between 0 and 13% of alpha olefin,
   (b) the alkylation, by the Freidel-Crafts reaction, of an aryl hydrocarbon other than benzene by said linear mono-olefin.

2. A process according to claim 1 wherein said linear mono-olefin contains a molar proportion of between 5 and 11% of alpha olefin, 3. A process according to claim 2 wherein said linear mono-olefin contains molar proportion of between 7 and 10% of alpha olefin, 4. A process according to claim 1 further comprising the steps of:
   (c) the sulfonation of the alkylaryl hydrocarbon obtained from step (b), and
   (d) the reaction of the resulting sulfonic acid with an excess of alkaline earth base.

5. A process according to claim 4, wherein the catalyst used in the Friedel- Crafts reaction is selected from the group consisting hydrofluoric acid, aluminum chloride, boron fluoride, a sulfonic ion exchange resin, and an acid-activated clay.

6. A process for the preparation of an alkylaryl hydrocarbon comprising an aryl substituent other than phenyl on a linear alkyl chain containing between 14 and 40 carbon atoms, wherein the molar proportion of aryl substituent on positions 1 and 2 of the linear alkyl chain is comprised between 0 and 13%, said process comprising the alkylation, by the Friedel-Crafts reaction, of an aryl hydrocarbon other than benzene by a linear mono-olefin containing between 14 and 40 carbon atoms, and having a molar proportion of alpha olefin of at least 80% wherein the alkylation takes place in a first step in which the molar ratio between the aryl hydrocarbon and the linear mono-alpha olefin is a maximum of 1.5, and in a second step in which said ratio is a minimum of 2.

7. A process according to claim 6 wherein the alkylation takes place in a first step in which the molar ratio between the aryl hydrocarbon and the linear mono-alpha olefin is a maximum of 1, and in a second step in which said ration is a minimum of 5.

8. A process according to claim 6 further comprising the steps of:
   (a) the sulfonation of the alklaryl hydrocarbon obtained from the second step of the alkylation, and
   (b) the reaction of the resulting sulfonic acid with an excess of alkaline earth base.

9. A superalkalinized alkylaryl sulfonate of alkaline earth metal, wherein the aryl radical is other than phenyl, wherein the alkyl chain is a linear chain that contains between 14 and 40 carbon atoms, and wherein said aryl-sulfonate radical of alkaline earth metal is fixed, in a molar proportion comprised between 0 and 13% in positions 1 or 2 of the linear alkyl chain.

10. A superalkalinized alkylaryl sulfonate of alkaline earth metal according to claim 9 wherein said aryl-sulfonate radical of alkaline earth metal is fixed, in a molar proportion comprised between 5 and 11% in positions 1 or 2 of the linear alkyl chain.

11. A superalkalinized alkylaryl sulfonate of alkaline earth metal according to claim 10 wherein said aryl-sulfonate radical of alkaline earth metal is fixed, in a molar proportion comprised between 7 and 10% positions 1 or 2 of the linear alkyl chain.

12. A superalkalinized alkylaryl sulfonate of alkaline earth metal according to claim 9 wherein said aryl radical is selected from the group consisting of tolyl, xylyl, o-xylyl, ethyl-phenyl, and cumenyl radicals.

13. A superalkalinized alkylaryl sulfonate of alkaline earth metal according to claim 9 wherein said alkyl chain contains between 16 and 30 carbon atoms.

14. A superalkalinized alkylaryl sulfonate of alkaline earth metal according to claim 13 wherein said alkyl chain contains between 20 and 24 carbon atoms.

* * * * *